United States Patent Office 3,721,674
Patented Mar. 20, 1973

3,721,674
PIPERAZINYL ETHYL CARBAMATES
Franklin W. Abbate, North Haven, and William J. Farrissey, Jr., Northford, Conn., assignors to The Upjohn Company, Kalamazoo, Mich.
No Drawing. Filed Mar. 2, 1970, Ser. No. 15,878
Int. Cl. C07d 51/70
U.S. Cl. 260—268 R          2 Claims

ABSTRACT OF THE DISCLOSURE

Piperazinyl ethyl carbamates are obtained in good yield by reacting an N,N-dihydrocarbylcarbamate with triethylenediamine at an elevated temperature. The piperazinyl derivative so formed are useful in the preparation of acid-soluble and acid-dyeable polyurethanes, and as catalysts in the manufacture of polyurethanes.

BACKGROUND OF THE INVENTION (1) Field of the invention

This invention relates to novel piperazinyl ethyl carbamates and is particularly concerned with piperazinyl ethyl carbamates obtained by the reaction of an N,N-dihydrocarbylcarbamate with triethylenediamine at an elevated temperature.

(2) Description of the prior art

The only work previously described in the art in which triethylenediamine has been employed as a reactant to give a piperazine derivative is that of Ross et al., JACS 853,999 (1963) who reacted 2,3-dinitrochlorobenzene with triethylenediamine to form the compound:

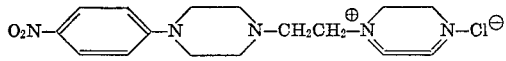

SUMMARY OF THE INVENTION

The present invention comprises novel compounds of the formula:

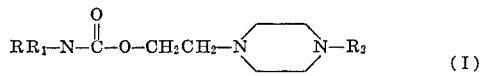

wherein R and $R_1$ are independently selected from the group consisting of hydrocarbyl of 1 to 12 carbon atoms, $R_2$ is selected from the group consisting of $CH_3$ and is straight chain lower alkyl, and to a process for preparing such novel compounds.

The novel piperazine derivatives of this invention can be utilized as catalysts in preparing valuable polyurethanes including acid-soluble and acid-dyeable products.

Throughout this specification and the appended claims the term "hydrocarbyl of from 1 to 12 carbon atoms" means the monovalent radical resulting when one hydrogen atom is removed from the parent hydrocarbon having the requisite number of carbon atoms. Illustrative of such groups are (a) alkyl, such as methyl, ethyl, propyl, butyl, pentyl, hexyl, heptyl, octyl, nonyl, decyl, undecyl, dodecyl; (b) alkenyl, such as vinyl, allyl, butenyl, pentenyl, hexenyl, octenyl, dodecenyl, etc.; (c) aralkyl, such as benzyl, phenylethyl, phenylpropyl, phenylhexyl, naphthylmethyl, etc.; (d) aryl, such as phenyl, tolyl, xylyl, naphthyl, bis-phenylyl, etc.; (e) alkaryl, such as ethylphenyl, isopropylphenyl, ethylxylyl, methylnaphthyl, etc.; (f) cycloalkyl, such as cyclobutyl, cyclohexyl, cyclooctyl, cyclodecyl, etc.; and (g) cycloalkenyl such as cyclobutenyl, cyclopentenyl, cyclohexenyl, cyclooctenyl, cyclododecenyl, etc., and isomeric forms of members of the above groups. The phrase straight chain "lower alkyl" in this specification means alkyl of from 2 to 8 inclusive carbon atoms, as exemplified by ethyl, propyl, butyl, pentyl, hexyl, heptyl, and octyl.

A wide variety of catalysts are employed in the preparation of polyurethanes and especially in preparing polyurethane foams by the reaction of polyisocyanates with polyols in the presence of a fluorocarbon foaming agent. One of the most important of these catalysts is triethylenediamine which is employed in substantial quantities in the urethane industry in foam preparation as well as in the manufacture of other urethane products. It has been found that the novel piperazinyl ethyl carbamates of this invention are valuable urethane catalystse which may be employed as a substitute for a part or all of the triethylenediamine commonly utilized in a production of polyurethanes by interaction of diisocyanates and polyols or in the production of polyureas by interaciton of diisocyanates and polyamines. Methods for producing such polyurethanes and polyureas in the form of film, fibers or in the production of polyureas by interaction of diisocyanates and polyols together with the novel catalysts of this invention will be readily apparent to those skilled in the art. Conventional procedures for the synthesis of such polyurethanes are described by Saunders et al., Polyurethanes, Chemistry and Technology, Part II, Interscience Publishers, 1964, pp. 299-451.

Examples orf art-recognized polyols which can be employed alone, or as mixtures, in preparing polyurethanes include the following:

(1) aliphatic diols, such as ethylene glycol, 1,2-propylene glycol, 1,4-butanediol, 1,2-hexane, 1,5-pentanediol, 1,2-hexanediol, etc.;
(2) aliphatic triols, such as trimethylolmethane, trimethylolethane, 1,2,3-hexanetriol, 1,1,1-trimethylolhexane, etc.;
(3) aliphatic tetrols, such as erythritol, pentaerythritol, etc.;
(4) aliphatic pentols, such as arabitol, xylitol, etc.;
(5) aliphatic hexols, such as mannitol, sorbitol, dipentaerythritol, etc.;
(6) aniline-alkylene oxide diol adducts; and adducts prepared by reacting any of the above-named compounds (1) through (5) above with one or more molar proportions of ethylene oxide, propylene oxide, 1,2-butylene oxide, or mixtures thereof.

Any of the prior art polyisocyanates can be used as reactants in preparing polyurethane products when utilizing the novel products of this invention as catalysts e.g., 2,4-tolylene diisocyanate, 2,6-tolylene diisocyanate, 4,4'-diphenylmethane diisocyanate, dianisidine diisocyanate, tolidine diisocyanate, hexamethylene diisocyanate, m-xylylene diisocyanate, 1,5-naphthalene diisocyanate, and other di- and higher polyisocyanates such as those listed in the tables of Siefken, Ann. 562, 122-135 (1949). Preferred polyisocyanates, however, are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. Pat. Nos. 2,683,730; 2,950,263; and 3,012,008; Canadian Pat. No. 665,495; and German specification 1,131,877.

In preparing polyurethane products employing the novel piperazinyl ethyl carbamates of this invention as catalysts, or as a part of the catalyst mixture, by reaction of any of the polyisocyanates conventionally employed in the art with the available polyols, blowing agents, surfactants, cell-openers and the like adjuvants commonly employed for the production of polyurethane products may be used. If desired, special polyols such as the phosphorus-containing polyols can be incorporated in the polyurethane reaction mixture in order to impart fire retardent properties to the resulting foam. Examples of such phosphorus-containing polyols are the tris polypropylene glycol phosphates produced by interaction of phosphoric and propylene oxide as, for example, described in U.S. Pat. Nos. 2,372,244 and 3,094,549.

DETAILED DESCRIPTION OF THE INVENTION

The novel piperazinyl ethyl carbamates (I) of this invention are obtained by reacting an N,N-dihydrocarbylcarbamate with triethylenediamine at an elevated temperature.

The N,N-dihydrocarbylcarbamates employed as starting materials in the process of this invention have the following formula:

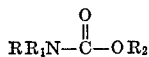

wherein R, $R_1$ and $R_2$ are as previously defined.

In preparing the compositions of this invention, the N,N-dihydrocarbylcarbamate employed as a starting material is preferably reacted with triethylenediamine in the presence of an inert organic solvent. The inert organic solvent can be any organic solvent which is inert under the conditions of the reaction, i.e., does not enter into reaction with any of the reactants employed or in any way interfere with the progress of the reaction. Suitable inert organic solvents include benzene, toluene, xylene, naphthalene, decalin, chlorobenzene, o-dichlorobenzene, bromobenzene, etc.

Advantageously, the reaction of the N,N-dihydrocarbylcarbamate with the triethylenediamine is conducted at a temperature ranging from about 80° C. to about 250° C. and preferably at a temperature within the range of about 100° C. to about 175° C. Approximately stoichiometric quantities of the two reactants are generally employed although, if desired, an excess of the carbamate can be utilized. The progress of the conversion of the N,N-dihydrocarbylcarbamate to the desired piperazine derivative can be followed by any of the appropriate analytical techniques such as infrared spectrographic analysis, etc. The desired piperazinyl ethyl carbamate can be isolated from the reaction mixture by convensional procedures in organic chemical operations such as by extraction, distillation, precipitation as the hydrochloric acid salt, etc.

The N,N-dihydrocarbylcarbamates utilized as starting materials are for the most part known compounds which can be prepared by methods conventional in the art for the preparation of N-substituted carbamates. A particularly convenient method involves the reaction of the appropriate chloroformate and appropriate dihydrocarbylamine; see, for example, H. von Pechmann, Ber, 28, 855 (1895) for a description of the preparation of ethyl N-methylcarbamate from methylamine and ethyl chloroformate as representative of the conditions required in preparing this series of compounds. Another method for the preparation of N,N-disubstituted carbamates involves the reaction of the corresponding N,N-disubstituted carbamyl halide with the appropriate alcohol for example, using the procedure described by Gattermann, Annalen 244, 30 (1888) for the reaction of carbamyl chloride itself with alcohols.

N,N-disubstituted carbamates can also be obtained by the alkylation of olefins with urethane (ethyl carbamate) as described by Mueller and Merten, Ber., 98, 1097 (1965) and by condensation of aldehydes with alkyl carbamates as described, for instance, by Bischoff, Ber., 7, 628 (1874).

The following examples describe the manner and process of making and using the invention and set forth the best mode contemplated by the inventors of carrying out the invention but are not to be construed as limiting.

EXAMPLE I

Methylpiperazinylethyl N-methyl-N-phenylcarbamate

The total of 3.18 grams of methyl N-methyl-N-phenylcarbamate together with 2.15 grams of triethylenediamine was added to 25 ml. of chlorobenzene and the mixture was refluxed for 24 hours.

After the reaction mixture had been poured into a small quantity of water, it was diluted with ether and then extracted with water followed by extraction with three portions of 1 N hydrochloric acid and finally extracted with an aqueous saturated salt solution. The aqueous layer was washed with two portions of ether. The combined organic layers were washed with three portions of an aqueous saturated salt solution and finally dried over magnesium sulfate. This phase contained the unreacted starting material which can be recycled.

The aqueous layers were combined, made basic with concentrated sodium hydroxide and extracted in a continuous extractor for about 16 hours. From the extract, after it had been dried over magnesium sulfate and after removal of solvent by evaporation, there was obtained 2.21 g. (83 percent of the theoretical yield) of the compound:

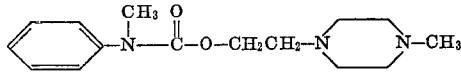

which was identified by infrared spectroscopic and nuclear magnetic resonance analyses.

EXAMPLE II

To 25 ml. of chlorobenzene there was added with mixing 1.65 grams of methyl N-methyl-N-phenylcarbamate and 112 mg. of triethylenediamine and the resulting reaction mixture was refluxed for 16 hours. An additional quantity of triethylenediamine in the amount of 1.0 g. was added and refluxing was continued for a period of 20 hours.

The resulting reaction mixture was worked up into basic and neutral fractions following the general procedure of Example I.

There was recovered from the basic phase fraction a total of 0.77 g. (82 percent of the theoretical yield) of the compound:

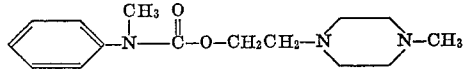

having a boiling point of 109–110° C. at 0.1 mm. Hg, which was identified by infrared spectroscopic and nuclear magnetic resonance analyses. The infrared spectrum (carbon tetrachloride solution) exhibited a maximum at 5.82μ.

EXAMPLE III

Utilizing the procedure of Example I but replacing methyl N-methyl-N-phenylcarbamate with:

ethyl N-propyl-N-isohexylcarbamate,
butyl N-ethyl-N-xylylcarbamate,
heptyl N,N-diphenylcarbamate,
octyl N-methyl-N-n-hexenylcarbamate,
methyl N-ethyl-N-isopropylphenylcarbamate,
hexyl N,N-dicyclobutylcarbamate, or
pentyl N-tolyl-N-cyclohexenylcarbamate, there are obtained in good yield:

ethylpiperazinylethyl N-propyl-N-isohexylcarbamate,
butylpiperazinylethyl N-ethyl-N-xylylcarbamate,
heptylpiperazinylethyl N,N-diphenylcarbamate,
octylpiperazinylethyl N-methyl-N-n-hexenylcarbamate,
methylpiperazinylethyl N-ethyl-N-isopropylphenylcarbamate, hexylpiperazinylethyl N,N-dicyclobutylcarbamate, and pentylpiperazinylethyl N-tolyl-N-cyclohexenylcarbamate, respectively.

Highly useful polyurethane foams can be prepared in which the novel piperazinyl ethyl carbamates of this invention are employed as the catalysts. The preparation of a typical foam product is set forth in the following preparation:

Using a mechanical blender, 100 parts by weight of polyol of equivalent weight 133 which is a blend of (i) an adduct of propylene oxide and a methylene bridged polyphenyl polyamine mixture obtained by acid condensation of aniline and formaldehyde and (ii) a glycerol-propylene oxide adduct, 2.3 parts by weight of a water-soluble silicone-glycol copolymer cell control agent and foam stabilizer, and 3.0 parts by weight of methylpiperazinylethyl N-methyl-N-phenylcarbamate are mixed together after which 32 parts by weight of a blowing agent, which is stabilized trichlorofluoromethane, is added. To the resulting mixture is added as rapidly as possible, 112 parts by weight of polymethylene polyphenyl isocyanate of equivalent weight 113 (PAPI®). The mixture thus-obtained is stirred with a high speed stirrer for approximately 30 seconds and then is poured into an open mold (7″ x 7″ x 12″). The resulting foam, which is allowed to rise freely, is cured at room temperature (about 20° C. to 25° C.) for 7 days and afterwards subjected to physical testing. A polyurethane foam suitable for a wide variety of commercial applications, such as in the preparation of packaging containers, structural panels, etc. is obtained.

What is claimed is:

1. A compound of the formula:

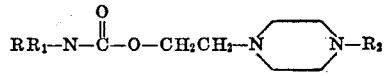

wherein R is selected from the group consisting of methyl, ethyl, n-propyl and n-butyl and $R_1$ is phenyl and $R_2$ is selected from the group consisting of methyl and ethyl.

2. The compound of claim 1 wherein R is $CH_3$, $R_1$ is phenyl and $R_2$ is $CH_3$.

References Cited

UNITED STATES PATENTS

| | | | |
|---|---|---|---|
| 2,585,826 | 2/1952 | Olsen | 260—268 R |
| 3,979,502 | 4/1961 | Gailliot | 260—268 R |
| 3,138,597 | 6/1964 | Schut | 260—268 PH |
| 3,264,290 | 8/1966 | Bernstein et al. | 260—268 R |
| 3,282,934 | 11/1966 | Sherlock et al. | 260—268 R |
| 3,394,131 | 7/1968 | Yale et al. | 260—243 AA |

DONALD G. DAUS, Primary Examiner

U.S. Cl. X.R.

260—268 PH, 268 T, 468 C, 471 R, 482 C